(12) United States Patent
Terazawa

(10) Patent No.: US 11,919,714 B2
(45) Date of Patent: Mar. 5, 2024

(54) VENEER SHEET FEED DEVICE FOR MULTISTAGE VENEER SHEET DRYER

(71) Applicant: TAIHEI MACHINERY WORKS, LTD., Aichi (JP)

(72) Inventor: Hideyuki Terazawa, Aichi (JP)

(73) Assignee: TAIHEI MACHINERY WORKS, LTD., Aichi (JP)

(*) Notice: Subject to any disclaimer, the term of this patent is extended or adjusted under 35 U.S.C. 154(b) by 341 days.

(21) Appl. No.: 17/602,940

(22) PCT Filed: Apr. 15, 2019

(86) PCT No.: PCT/JP2019/016121
§ 371 (c)(1),
(2) Date: Oct. 11, 2021

(87) PCT Pub. No.: WO2020/213026
PCT Pub. Date: Oct. 22, 2020

(65) Prior Publication Data
US 2022/0162005 A1 May 26, 2022

(51) Int. Cl.
*B65G 13/02* (2006.01)
*B65G 41/00* (2006.01)
(Continued)

(52) U.S. Cl.
CPC .......... *B65G 13/02* (2013.01); *B65G 41/002* (2013.01); *B65G 43/10* (2013.01); *B65G 47/646* (2013.01);
(Continued)

(58) Field of Classification Search
None
See application file for complete search history.

(56) References Cited

U.S. PATENT DOCUMENTS 4,838,408 A * 6/1989 Brawn ............... B65G 47/2445
198/434
5,551,543 A * 9/1996 Mattingly ............ B65G 19/306
198/370.09
(Continued)

FOREIGN PATENT DOCUMENTS

JP S46-007054 B 2/1971
JP S51-060077 U 5/1976
(Continued)

OTHER PUBLICATIONS

International Search Report for International Application No. PCT/JP2019/016121 dated Jun. 18, 2019.

*Primary Examiner* — Kavel Singh
(74) *Attorney, Agent, or Firm* — Thomas | Horstemeyer, LLP

(57) ABSTRACT

A veneer sheet feed device for multistage veneer sheet dryer is provided between an auto feeder including a carry-in conveyor and a roll dryer (veneer sheet dryer). The veneer sheet feed device is provided with a guide member and a feed conveyor for feeding a veneer sheet carried in from the carry-in conveyor to each conveyance unit of the roll dryer in this order from a conveyance up stream side. The veneer sheet feed device further provided with a pivot mechanism that allows a starting end of the guide member belonging to the conveyance stage immediately above the conveyance stage in which the veneer sheet is carried this time from the carry-in conveyor to pivot to a portion above a horizontal position of a roller shaft located at a terminal end of this guide member.

3 Claims, 10 Drawing Sheets

(51) Int. Cl.
*B65G 43/10* (2006.01)
*B65G 47/64* (2006.01)
*F26B 25/00* (2006.01)

(52) U.S. Cl.
CPC .... *F26B 25/004* (2013.01); *B65G 2201/0217* (2013.01); *B65G 2201/022* (2013.01); *B65G 2201/0282* (2013.01); *F26B 2210/14* (2013.01)

(56) References Cited

U.S. PATENT DOCUMENTS

| | | | | |
|---|---|---|---|---|
| 5,921,374 | A * | 7/1999 | Takino | B65G 13/10 193/35 MD |
| 6,581,749 | B2 * | 6/2003 | Wood | B65G 47/34 198/370.09 |
| 8,813,947 | B1 * | 8/2014 | Tracy | B07C 5/14 209/552 |

FOREIGN PATENT DOCUMENTS

| | | |
|---|---|---|
| JP | S63-127971 A | 5/1988 |
| JP | H06-055506 A | 3/1994 |
| JP | 2013193835 A | 9/2013 |
| JP | 2019142695 A | 8/2019 |

* cited by examiner

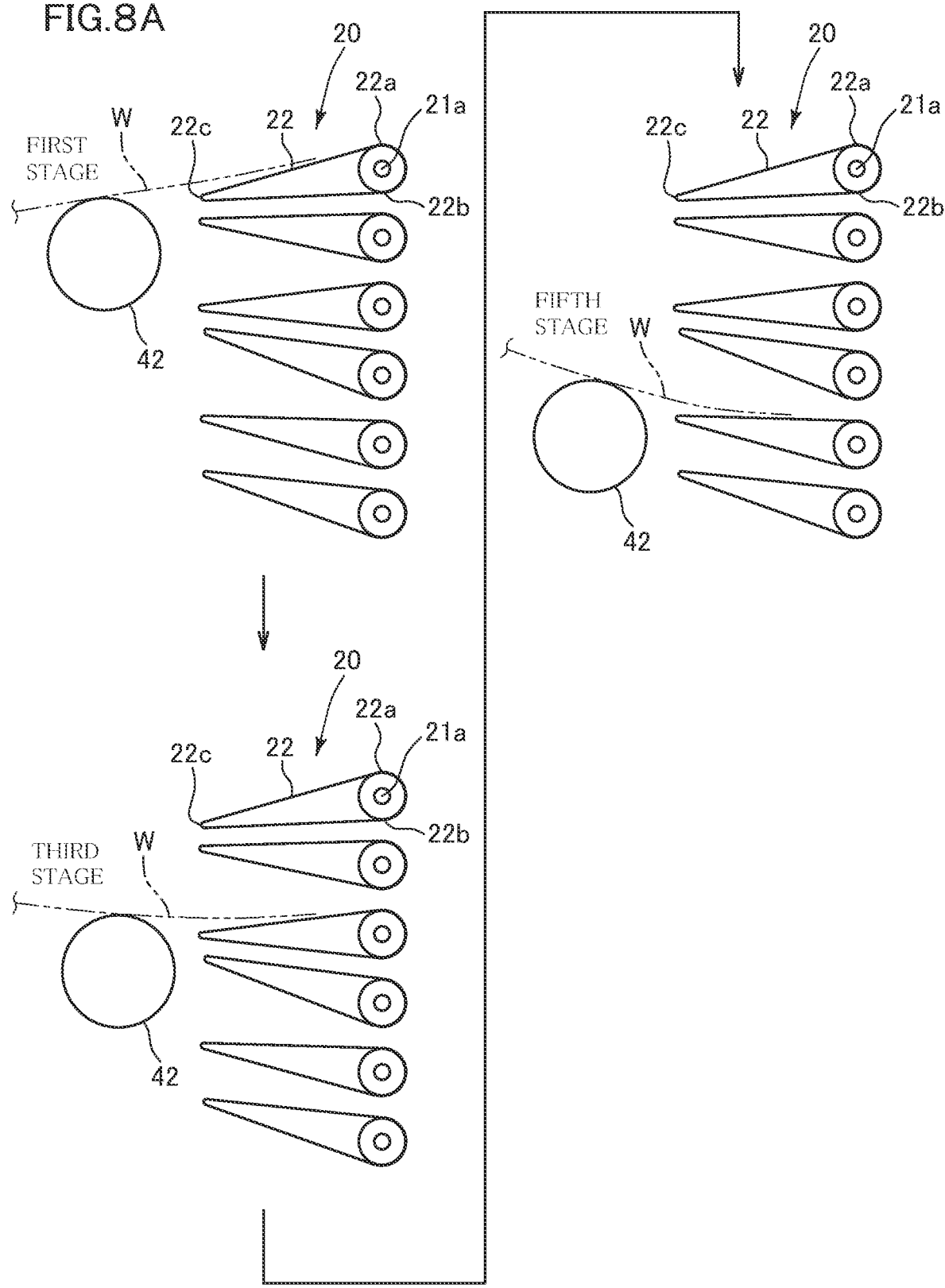

VENEER SHEET FEED DEVICE FOR MULTISTAGE VENEER SHEET DRYER

CROSS-REFERENCE TO RELATED APPLICATIONS

This application is a National Stage entry of International Application No. PCT/JP2019/016121, filed Apr. 15, 2019. The disclosures of the prior application are incorporated herein by reference in their entirety.

BACKGROUND OF THE INVENTION

Field of the Invention

The invention relates to a veneer sheet feed device for multistage veneer sheet dryer.

Description of the Related Art

As a veneer sheet feed device for feeding a veneer sheet into a veneer sheet dryer, a device that delivers the veneer sheet from a delivery roller of a delivery device to the veneer sheet dryer via a guide plate and a feed roller is known (refer to, for example, following Patent Document 1). In the veneer sheet feed device disclosed in Patent Document 1, the guide plate and the feed roller are arranged for each of a plurality of conveyance stages corresponding to a plurality of upper and lower stages of conveyors of the veneer sheet dryer. The delivery roller on a conveyance downstream side is provided so as to be pivotable up and down around a predetermined pivot shaft on a conveyance upstream side, and the guide plates and the feed rollers are arranged so as to be radially spread vertically from the conveyance upstream side toward the conveyance downstream side corresponding to feed positions determined in advance defined by pivot positions of a terminal end of the delivery roller. The veneer sheet feed device is set such that the veneer sheets are sequentially delivered from the delivery roller to the guide plates belonging to the respective conveyance stages in a predetermined order.

CITATION LIST

Patent Document

[Patent Document 1] Japanese Examined Patent Publication No. S46-7054

SUMMARY OF INVENTION

Technical Problem

As described above, the guide plates are arranged so as to be radially spread vertically from the conveyance upstream side to the conveyance downstream side corresponding to the feed positions of the delivery rollers, respectively, and an opening space between starting ends of the guide plates is narrower than an opening space between terminal ends. For this reason, when the veneer sheet is fed to each delivery roller side, there is a problem that the veneer sheet easily comes into contact with the guide plate belonging to the conveyance stage immediately above the conveyance stage in which this is fed. In general, in order to improve filling efficiency of the veneer sheets in the veneer sheet dryer, the delivery roller, the guide plate, and the feed roller of each conveyance stage are set to have such a width dimension that rectangular veneer sheets having lengths of three to six feet (about 90 cm to about 180 cm) may be simultaneously delivered in three or four lines, and the veneer sheets are conveyed in a state in which front and rear intervals are reduced in each conveyance stage. In this case, when the veneer sheet comes into contact with the guide plate, a conveyance posture of the veneer sheet is inclined and the veneer sheet might overlap with another veneer sheet parallel to the same in a front-rear or right-left direction, or, for example, as schematically illustrated in FIG. 9, in a case where a fiber direction of a veneer sheet W is parallel to a conveyance direction, the veneer sheet W might be split along streaks of the fiber.

An object of the invention is to provide a veneer sheet feed device capable of stably passing to each guide plate in a multistage veneer sheet dryer.

Means for Solving the Problem and Effects of the Invention

In order to solve the above-described object, a veneer sheet feed device for multistage veneer sheet dryer according to the invention is provided with:

feed conveyors provided between a carry-in conveyor a terminal end of which on a conveyance downstream side is provided so as to be pivotable up and down around a predetermined pivot shaft on a conveyance upstream side and a veneer sheet dryer including a plurality of upper and lower stages of conveyance units in which a plurality of pairs of upper and lower feed rollers is arranged in a conveyance direction, the feed conveyors for feeding veneer sheets carried in from the carry-in conveyor to the conveyance units for each of a plurality of upper and lower conveyance stages arranged corresponding to the conveyance units, in which the feed conveyors are arranged so as to be radially spread across the upper and lower conveyance stages from the conveyance upstream side to the conveyance downstream side corresponding to carry-in positions determined in advance defined by pivot positions of the terminal end of the carry-in conveyor, the veneer sheets are set to be sequentially carried in from the carry-in conveyor through guide members belonging to the conveyance stages to the feed conveyors in predetermined order, each of the guide members is provided such that a starting end on the conveyance upstream side is pivotable up and down around a predetermined pivot shaft on the conveyance downstream side, and a pivot mechanism that allows the starting end of the guide member belonging to the conveyance stage immediately above the conveyance stage in which a veneer sheet is carried from the carry-in conveyor this time to pivot to a portion above a horizontal position of a terminal end of this guide member.

In the veneer sheet feed device for multistage veneer sheet dryer according to the invention, the pivot mechanism of the veneer sheet feed device is configured to allow the starting end of the guide member belonging to the conveyance stage immediately above the conveyance stage in which the veneer sheet is carried this time from the carry-in conveyor to pivot to the portion above the horizontal position of the terminal end thereof. Therefore, it becomes possible to effectively prevent the veneer sheet from coming into contact with the guide member belonging to the conveyance stage immediately above the conveyance stage in which this is carried. As a result, it is possible to excellently prevent overlapping of the veneer sheets and damage of the veneer sheet due to the contact with the guide member.

BRIEF DESCRIPTION OF THE DRAWINGS

FIG. 8A is an illustrative view illustrating an example of a carry-in step at which a veneer sheet is carried in from a carry-in conveyor to the veneer sheet feed device.

DESCRIPTION OF EMBODIMENTS

Hereinafter, embodiments of the invention are described with reference to the drawings.

Figure 1:
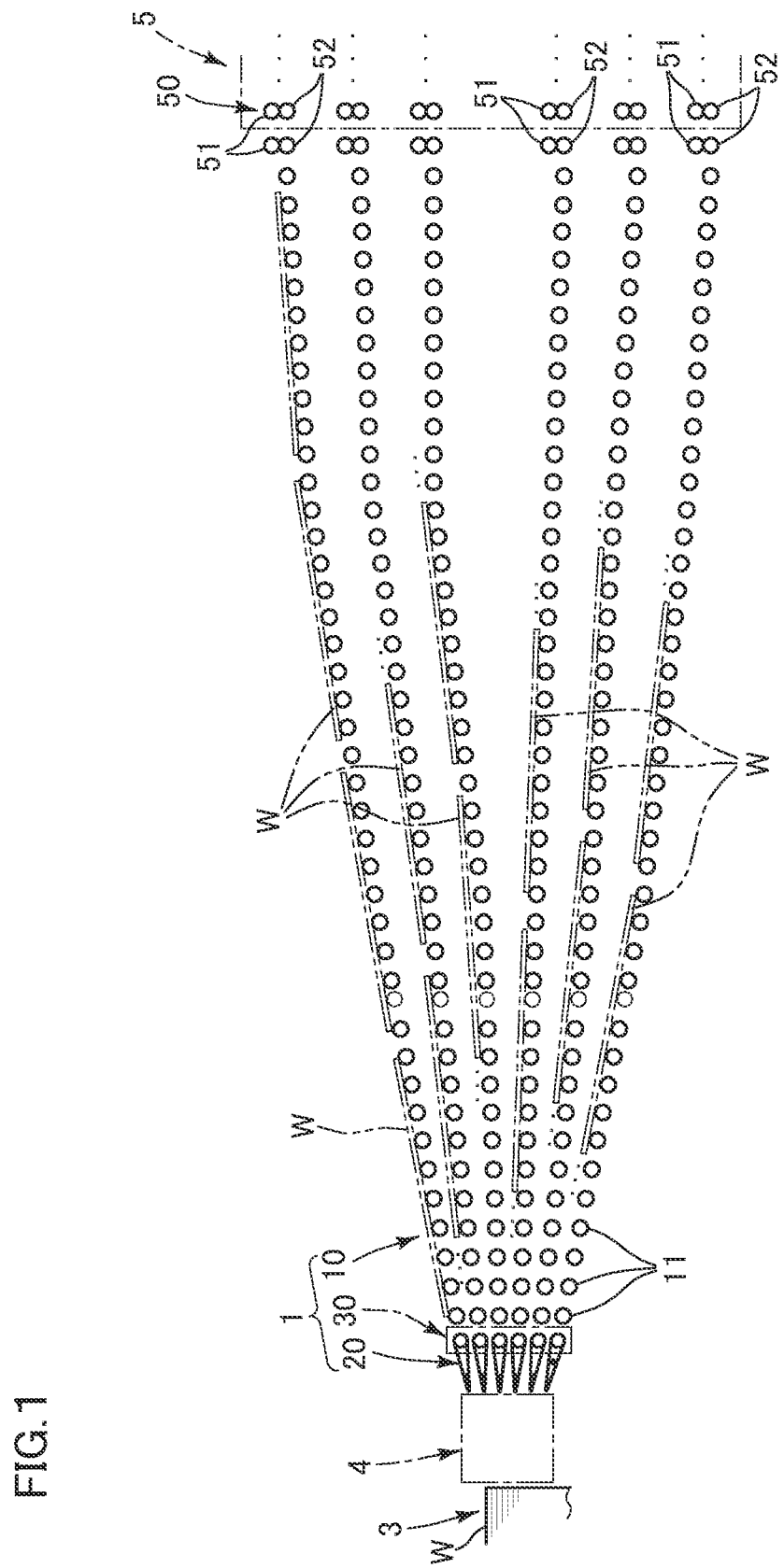
FIG. 1 is a schematic side view illustrating an example of a veneer sheet feed device for multistage veneer sheet dryer according to an embodiment of the invention.
Figure 2:
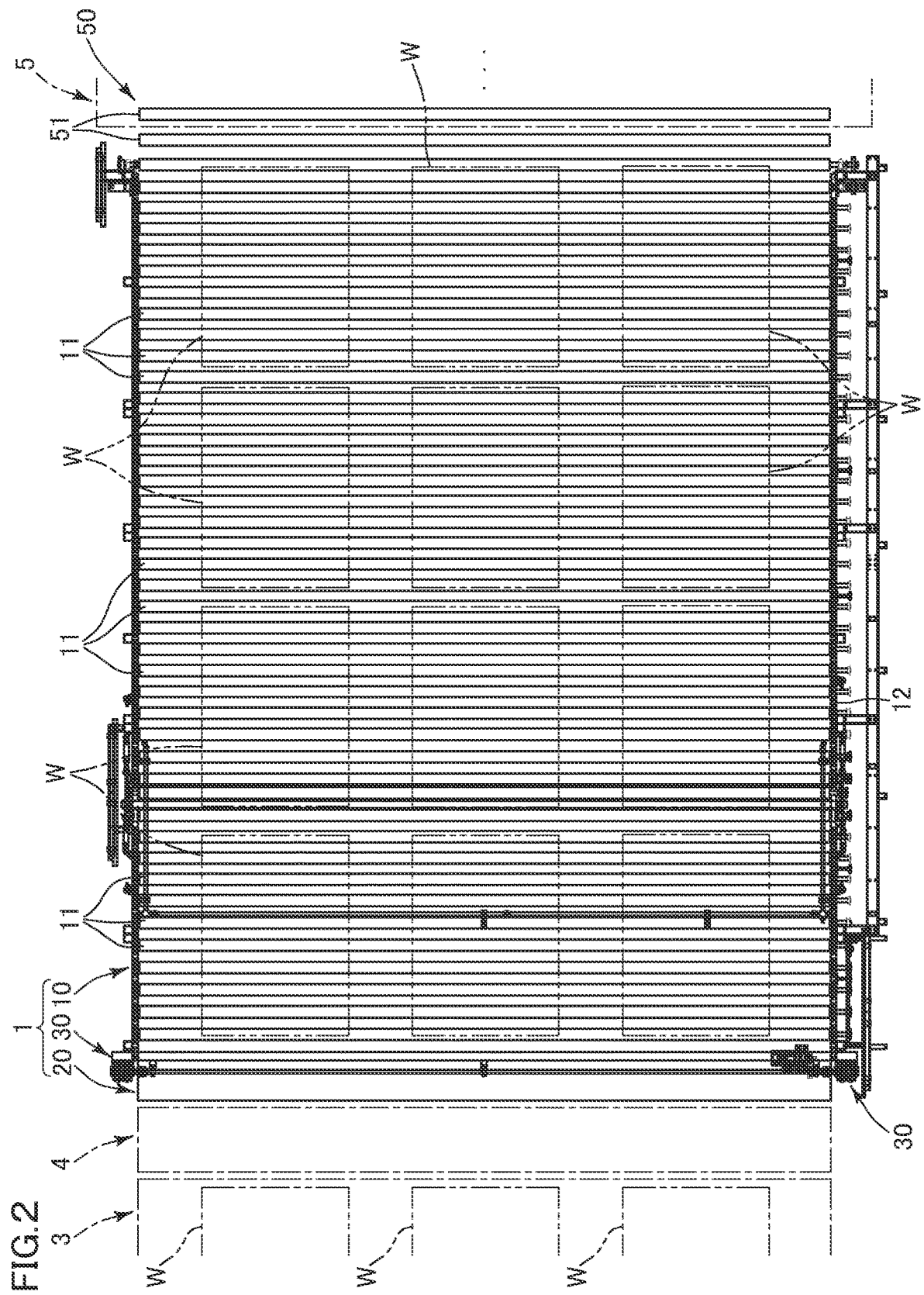
FIG. 2 is a plan view of FIG. 1.

FIGS. 1 and 2 are schematic views illustrating an example of a veneer sheet feed device for multistage veneer sheet dryer according to the invention. On a conveyance upstream side of a veneer sheet feed device 1, a deposition unit 3 in which rectangular plate-shaped veneer sheets W (veneer sheets having longitudinal dimensions of three feet (about 90 cm), four feet (about 120 cm), and six feet (about 180 cm), for example) are deposited, and an auto feeder 4 that supplies the veneer sheet W in the deposition unit 3 to the veneer sheet feed device 1 are provided in this order from a conveyance upstream. In contrast, a roll dryer 5 that dries the veneer sheet W is provided on a conveyance downstream side of the veneer sheet feed device 1.

Figure 5:
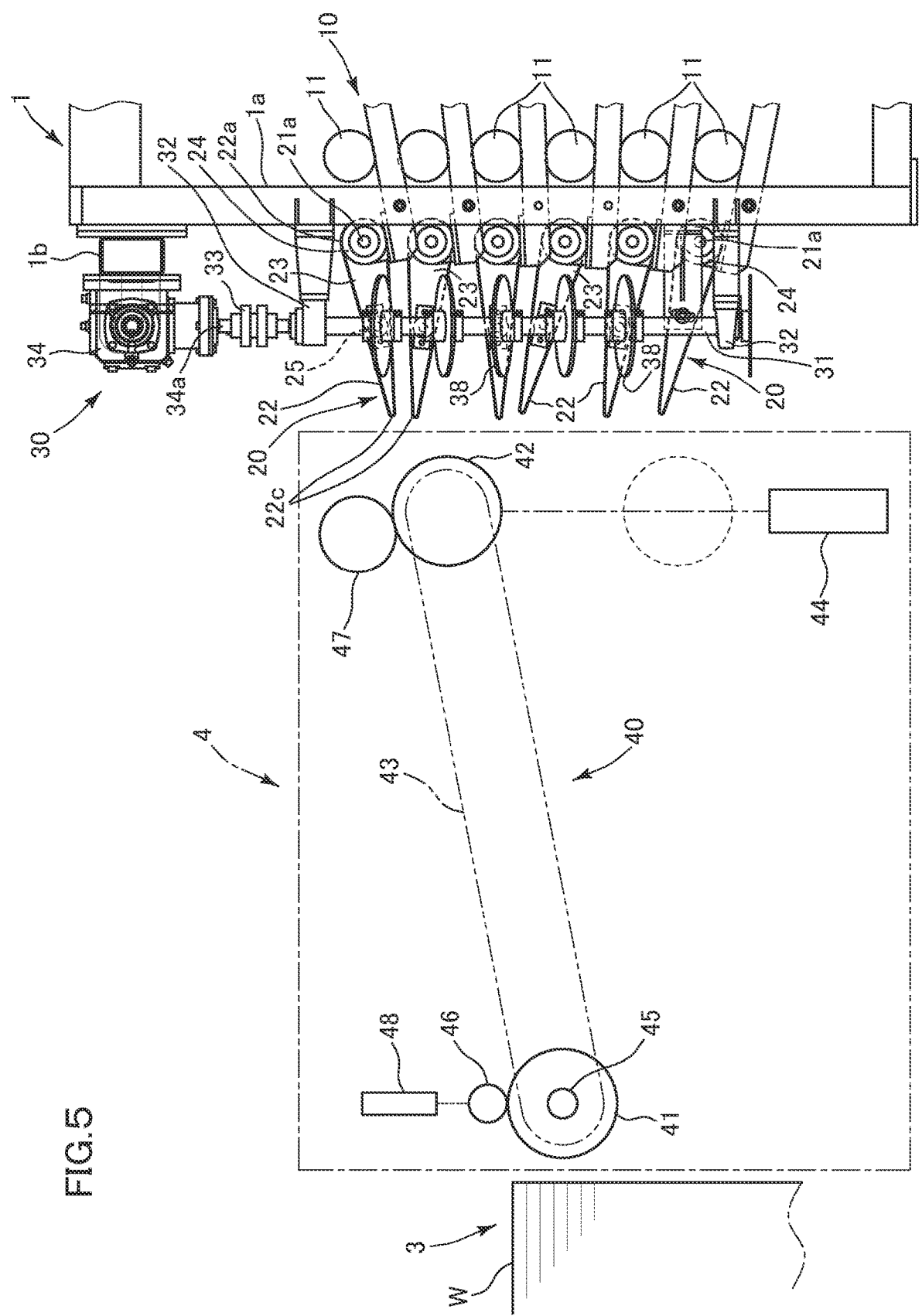
FIG. 5 is a side view of FIG. 4.

The veneer sheet W is supplied from the deposition unit 3 to the auto feeder 4 by manual work of an operator or an automatic operation of a vacuum device and the like (not illustrated) having a suction function. As schematically illustrated in FIG. 5, the auto feeder 4 is provided with a single-stage carry-in conveyor 40. In the carry-in conveyor 40, a roller 41 on a conveyance upstream side (starting end side) and a roller 42 on a conveyance downstream side (terminal end side) are coupled to each other so as to be drivable via a drive mechanism 43 including a sprocket and a roller chain.

The carry-in conveyor 40 is coupled to a piston rod of a fluid cylinder 44, and the roller 42 as a terminal end is pivotable up and down around a pivot shaft 45 on the conveyance upstream side (a case of being a shaft of the roller 41 is illustrated as an example in FIG. 5) as the fluid cylinder 44 is driven. When the piston rod of the fluid cylinder 44 extends maximally and the roller 42 is in a position indicated by solid line in FIG. 5, the carry-in conveyor 40 is in an upper limit position thereof, and when the piston rod of the fluid cylinder 44 contracts maximally and the roller 42 is in a position indicated by broken line in FIG. 5, the carry-in conveyor 40 is in a lower limit position thereof. Note that, in an initial state, the carry-in conveyor 40 is in the upper limit position thereof.

Rollers 46 and 47 are arranged above the rollers 41 and 42, respectively. The roller 46 may reciprocate between an operation position in which this comes into contact with the roller 41 with an extending operation of a fluid cylinder 48, so that this may send the veneer sheet W toward the roller 42 while sandwiching the same therebetween, and a non-operation position in which this separates from the roller 41 with a contacting operation of the fluid cylinder 48, so that this cannot send the veneer sheet W toward the roller 42. In contrast, the roller 47 constantly is in an operation position in contact with the roller 42, so that this may send the veneer sheet W toward the veneer sheet feed device 1 at any time.

With reference to FIGS. 1 and 2 again, the roll dryer 5 is provided with a conveyance unit 50 in which hot air is circulated while the veneer sheet W is conveyed. In the conveyance unit 50, a plurality of pairs of upper and lower feed rollers 51 and 52 are arranged in a conveyance direction. In the roll dryer 5, a plurality of stages of conveyance units 50 is vertically formed. FIG. 1 illustrates an example in which six stages of conveyance units 50 are arranged vertically. The roll dryer 5 corresponds to a veneer sheet dryer of the invention.

In the veneer sheet feed device 1, a plurality of conveyance stages is arranged vertically corresponding to the respective conveyance units 50 of the roll dryer 5, and a guide member 20 and a feed conveyor 10 for feeding the veneer sheet W carried in from the carry-in conveyor 40 of the auto feeder 4 to each conveyance unit 50 are provided in this order from the conveyance upstream side for each conveyance stage. FIG. 1 illustrates an example in which six conveyance stages are vertically arranged corresponding to the respective conveyance units 50 of the roll dryer 5.

In each feed conveyor 10, delivery rollers 11 are drivably connected to each other via a drive mechanism 12 including a sprocket and a roller chain (refer to FIG. 2). The feed conveyors 10 are arranged to so as to be radially spread vertically across the conveyance stages from the conveyance upstream side to the conveyance downstream side corresponding to carry-in positions determined in advance (refer to FIG. 5) defined by pivoting positions of the roller 42 of the carry-in conveyor 40. FIG. 1 illustrates an example in which upper three conveyance stages with obliquely upward gradient toward the downstream in the conveyance direction and lower three conveyance stages with obliquely downward gradient toward the downstream in the conveyance direction are arranged so as to be inclined.

In each conveyance stage, each delivery roller 11 is set to have such a width dimension that the rectangular veneer sheets W having the lengths of three to six feet (about 90 cm to about 180 cm) may be simultaneously delivered in three or four lines together with the guide member 20 and the feed roller 51 of the roll dryer 5 (refer to FIG. 2). The veneer sheets W are sequentially delivered from the carry-in conveyor 40 to the delivery roller 11 through the guide member 20 for each conveyance stage in a predetermined order.

Figure 6:
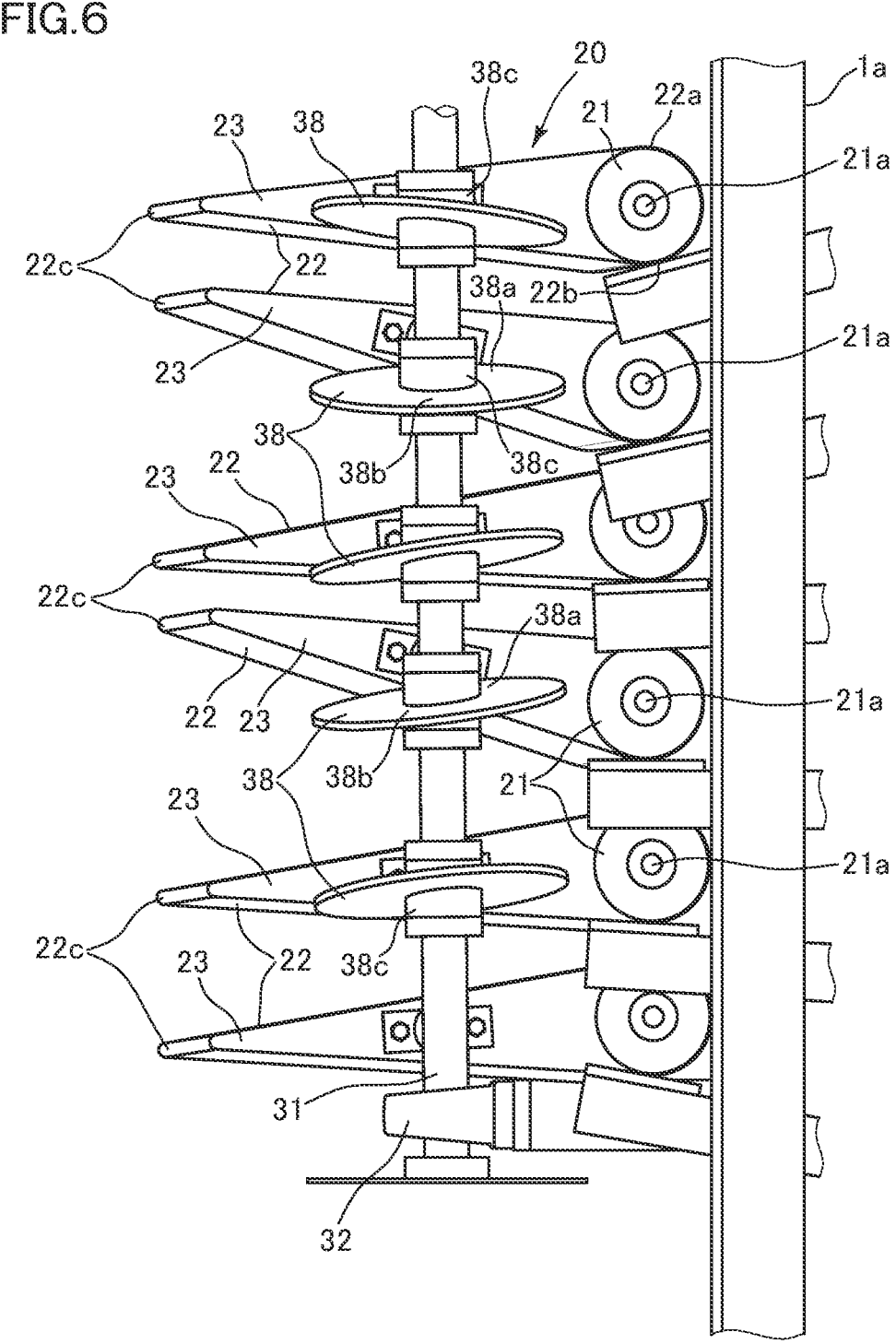
FIG. 6 is a perspective view schematically illustrating a substantial part of FIG. 5.

As illustrated in FIGS. 4 to 7, each guide member 20 is integrally provided with a guide roller 21 provided so as to be pivotable around an axis of a roller shaft 21a, a guide plate 22 obtained by bending a rectangular plate at an acute angle (about 10 to 30°) in an intermediate portion thereof, and connecting one end and the other end of the plate to an upper end edge 22a and a lower end edge 22b of the guide roller 21, respectively, with the intermediate portion of the plate as a starting end 22c in the conveyance upstream, and side walls 23 that shield both sides of the guide plate 22 (refer to FIG. 6).

Figure 4:
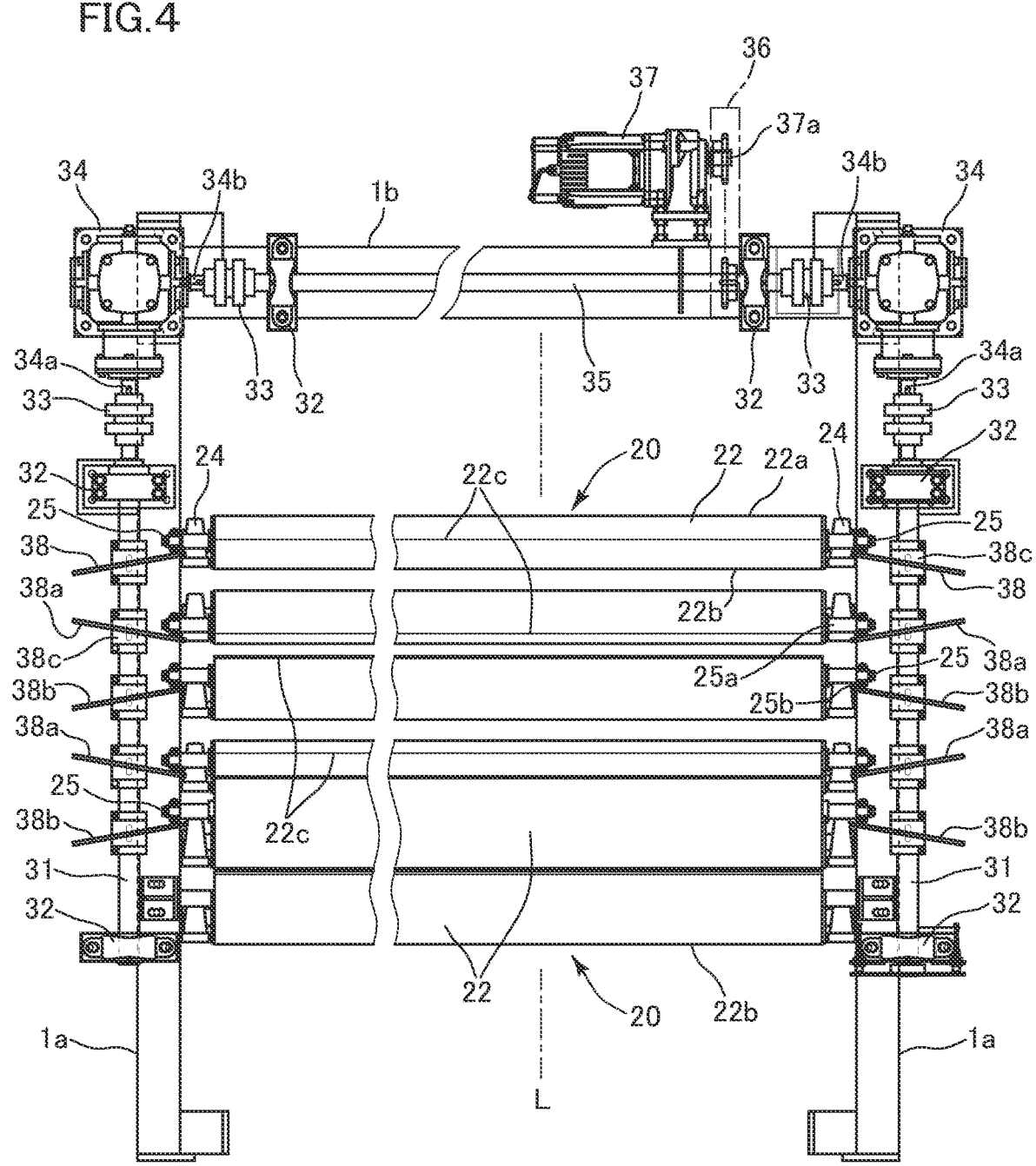
FIG. 4 is a front view of FIG. 3.

The guide roller 21 is rotatably supported by a frame 1a of the veneer sheet feed device 1 via the roller shaft 21a and a bearing 24 (refer to FIGS. 4 and 5). When the guide roller 21 pivots around the axis of the roller shaft 21a, the starting end 22c of the guide plate 22 pivots up and down around the roller shaft 21a.

The guide plate 22 is formed into a tapered shape tapered from the guide roller 21 located on a terminal end side on the conveyance downstream side toward the starting end 22c, and upper and lower surfaces thereof play a role of guiding and passing the veneer sheet W toward the delivery roller 11 while sliding the same (refer to FIG. 5). The vicinity of the roller shaft 21a of the guide roller 21 corresponds to a terminal end of the guide member 20. Note that, in FIGS. 6 and 7, the roller shaft 21a and the bearing 24 are not illustrated as appropriate.

Figure 7:
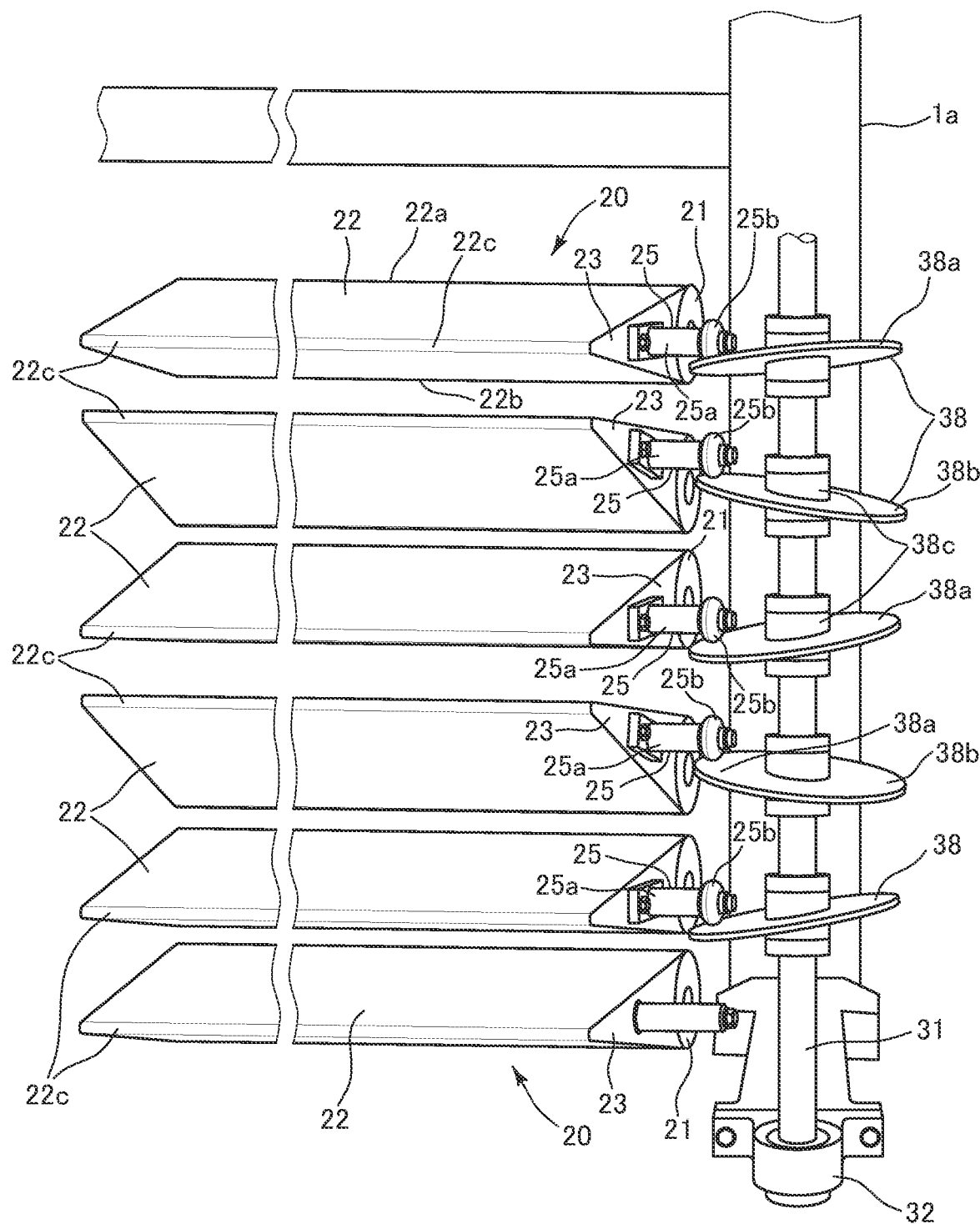
FIG. 7 is a perspective view of FIG. 6 as seen from a front side.

On each side wall 23, a cam follower 25 is provided parallel to an axial direction of the roller shaft 21a in a protruding manner (refer to FIGS. 4 and 7). The cam follower 25 is provided with a camshaft 25a having a circular cross-section, and a rolling roller 25b is rotatably supported at a distal end of the camshaft 25a around an axis thereof. The rolling roller 25b is configured to roll on a swash plate cam 38 to be described later.

Figure 3:
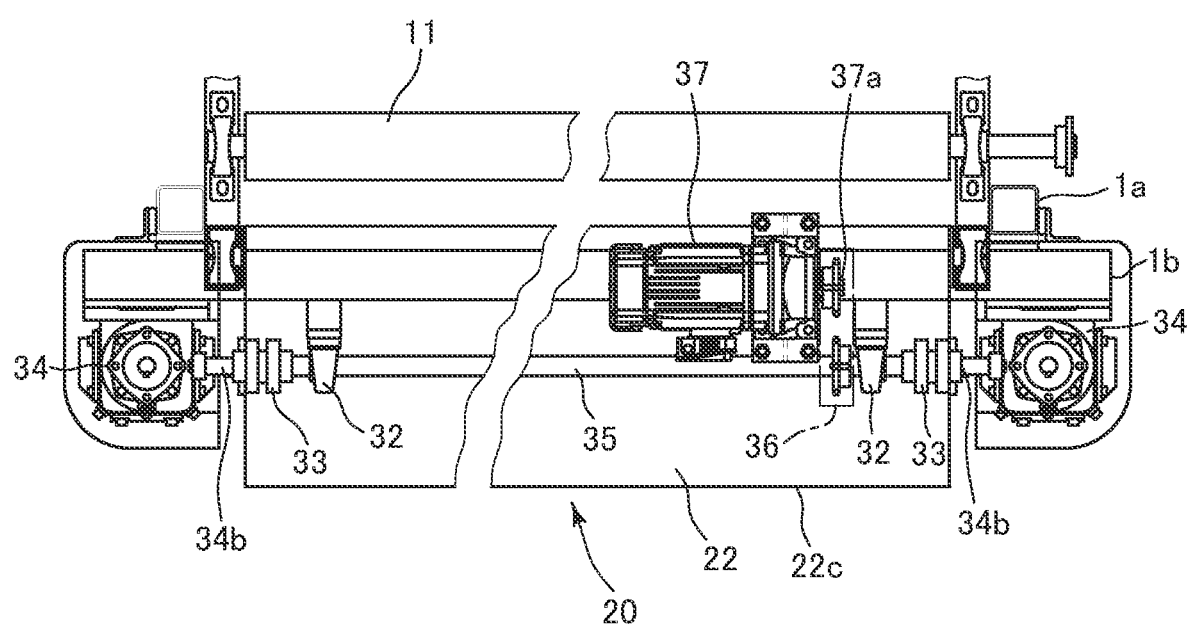
FIG. 3 is an enlarged view of a substantial part of FIG. 2.

Rotary output shafts 31 extending vertically are provided on both sides of each guide member 20 (refer to FIGS. 4 and 5). Each rotary output shaft 31 is rotatably supported by the frame 1a via a pair of bearings 32. An upper end of each rotary output shaft 31 is coupled to an output shaft 34a of a gearbox 34 via a shaft joint 33. An input shaft 34b of each gearbox 34 is coupled to each end of a rotary input shaft 35 horizontally extending via the shaft joint 33 (refer to FIGS. 3 and 4).

The rotary input shaft 35 is rotatably supported by a frame 1b via a pair of bearings 32, and is coupled to an output shaft 37a of a decelerator-equipped motor 37 via a drive mechanism 36 including a sprocket and a roller chain. As a result, when the decelerator-equipped motor 37 operates, the rotary input shaft 35 is rotary driven, and the rotary output shafts 31 are rotary driven in synchronization with the rotary drive of the rotary input shaft 35.

The swash plate cam 38 is attached to each rotary output shaft 31 corresponding to each guide member 20. Each swash plate cam 38 forms a cam mechanism that moves each guide member 20 up and down in cooperation with the rolling roller 25b of each cam follower 25 (refer to FIGS. 6 and 7). Each swash plate cam 38 has a disk shape and is fixed to the rotary output shaft 31 by means of a central boss 38c coaxial with the rotary output shaft 31 in a state inclined with respect to a horizontal plane orthogonal to the rotary output shaft 31 by a predetermined angle (about 10 to 30°), that is, in a state in which one semicircle of the disk forms an upper inclined portion 38a located obliquely upward and the other semicircle of the disk forms a lower inclined portion 38b located obliquely downward.

The swash plate cams 38 are fixed to each rotary output shaft 31 so as to be in the same inclined state every other stage, and are set such that phases around the rotary output shaft 31 of the swash plate cams 38 located next to each other vertically are shifted by 180°. In the rotary output shafts 31, the inclined states of the swash plate cams 38 corresponding to the same guide member 20 are set to be in the same phase, that is, set to be symmetrical with respect to a center line L in FIG. 4. Note that the "same inclined state" includes a case where the inclination angles are different within a range of about 5 to 20°. This is because an approach direction of the veneer sheet W conveyed from the carry-in conveyor 40 is different for each conveyance stage to which the guide member 20 belongs, and it might be appropriate to increase the inclination angle of the swash plate cams 38 corresponding to the guide members 20 belonging to upper and lower stages as compared with the swash plate cam 38 corresponding to the guide member 20 belonging to a middle stage in order to smoothly advance the veneer sheet W in some cases.

Specifically, for example, FIGS. 6 and 7 illustrate an aspect in which the swash plate cam 38 comes into contact with the rolling roller 25b of the cam follower 25 in a lowermost position (including a position in the vicinity of the lowermost position) of the lower inclined portion 38b (an aspect in which a depression angle of the swash plate cam 38 becomes substantially maximum in a case where the swash plate cam 38 is seen from a side opposite to the center line L) so that the starting end 22c of the guide member 20 belonging to an uppermost (first) conveyance stage is located at a lower limit (including a position in the vicinity of the lower limit) within a movable range thereof.

In contrast, an aspect in which the swash plate cam 38 comes into contact with the rolling roller 25b of the cam follower 25 in an uppermost position (including a position in the vicinity of the uppermost position) of the upper inclined portion 38a (setting in which an elevation angle of the swash plate cam 38 becomes substantially maximum in a case where the swash plate cam 38 is seen from the side opposite to the center line L) so that the starting end 22c of the guide member 20 belonging to a second conveyance stage is located at an upper limit (including a position in the vicinity of the upper limit) within a movable range thereof is illustrated. Third and fifth conveyance stages are set similarly to the first conveyance stage, and a fourth conveyance stage is set similarly to the second conveyance stage. Note that, in this embodiment, the camshaft 25a of the guide member 20 of a sixth conveyance stage is not provided with the rolling roller 25b, and the corresponding swash plate cam 38 is also omitted. The guide member 20 of the sixth conveyance stage has a specification in which setting of the inclined state may be manually changed. However, the guide member 20 in the sixth conveyance stage may also be provided with the cam follower 25 including the rolling roller 25b and the corresponding swash plate cam 38. In this case, this is set similarly to that in the second and fourth conveyance stages.

Since the uppermost position and the lowermost position of the swash plate cam 38 are in a point symmetrical relationship around the rotary output shaft 31, the phases are shifted by 180° around the rotary output shaft 31. Note that the expression of "the phases are shifted by 180°" does not mean that the phases are required to be correctly shifted by 180°, but includes an aspect with a difference in angle by about ±30° with respect to 180°. Each rotary output shaft 31, the rotary input shaft 35, the decelerator-equipped motor 37, each swash plate cam 38, each cam follower 25 and the like correspond to the pivot mechanism 30 of the invention, and each rotary output shafts 31 corresponds to a pivot shaft.

Note that both the guide member 20 illustrated in FIG. 6 and the guide member 20 schematically illustrated in FIG. 8A are in a state in which the starting ends 22c of the guide members 20 belonging to the first, third, and fifth conveyance stage are located at the lower limit within the movable range, and the starting ends 22c of the guide members 20 belonging to the second and fourth conveyance stages are located at the upper limit within the movable range; however, the inclined states of the guide members 20 belonging to the fifth conveyance stage are slightly different from each other due to a difference in inclination angle between the corresponding swash plate cams 38 (the guide member 20 in FIG. 6 is substantially horizontal, whereas the guide member 20 in FIG. 8A is in an obliquely upward state). However, in any case, the guide member 20 belonging to the fourth conveyance stage located immediately above is in the upper limit position, and an opening space of the fifth conveyance stage is sufficiently secured. Therefore, even if the setting of the inclined state of the swash plate cam 38 is changed in this manner, this still falls within this embodiment.

In the veneer sheet feed device 1 configured as described above, in order to improve filling efficiency of the veneer sheets W in the roll dryer 5, the delivery roller 11 and the guide member 20 of each conveyance stage are set to have such a width dimension that the rectangular veneer sheets W having the lengths of three to six feet (about 90 cm to about 180 cm) may be simultaneously delivered in three or four lines, and the veneer sheets W are conveyed in a state in which front and rear intervals are reduced in each conveyance stage (refer to FIG. 2). The veneer sheet W of each conveyance stage is conveyed in a state in which a front end position is shifted by a predetermined length from an immediately preceding stage according to the order of the conveyance stages on which this is conveyed (for example, as illustrated in FIG. 1, in a case where there are six conveyance stages and the length of the veneer sheet W is of six feet (about 180 cm), a state of being shifted by about one foot (about 30 cm).

Figure 8B:
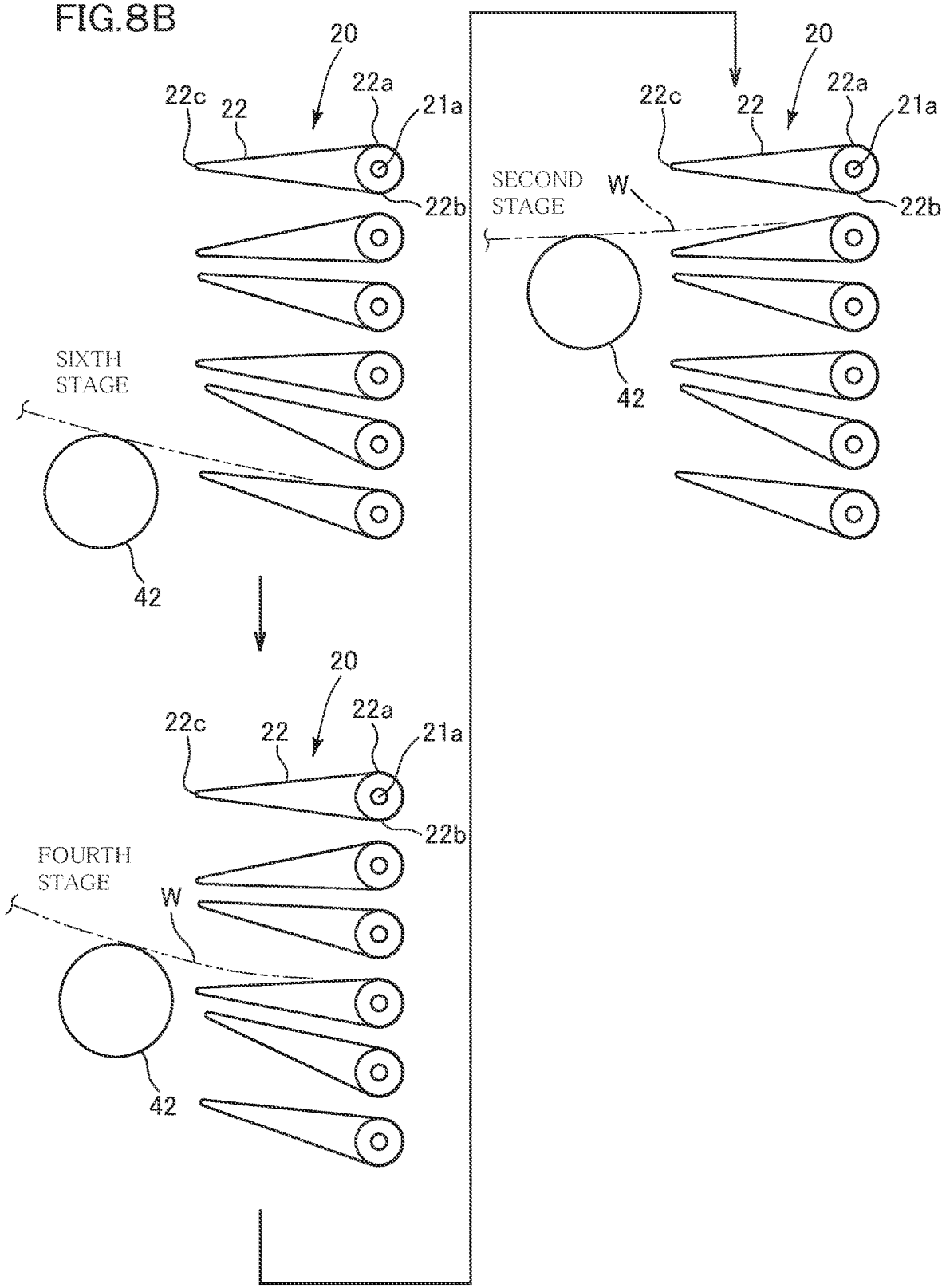
FIG. 8B is an illustrative view illustrating an example of the carry-in step subsequent to the step in FIG. 8A.
Figure 9:
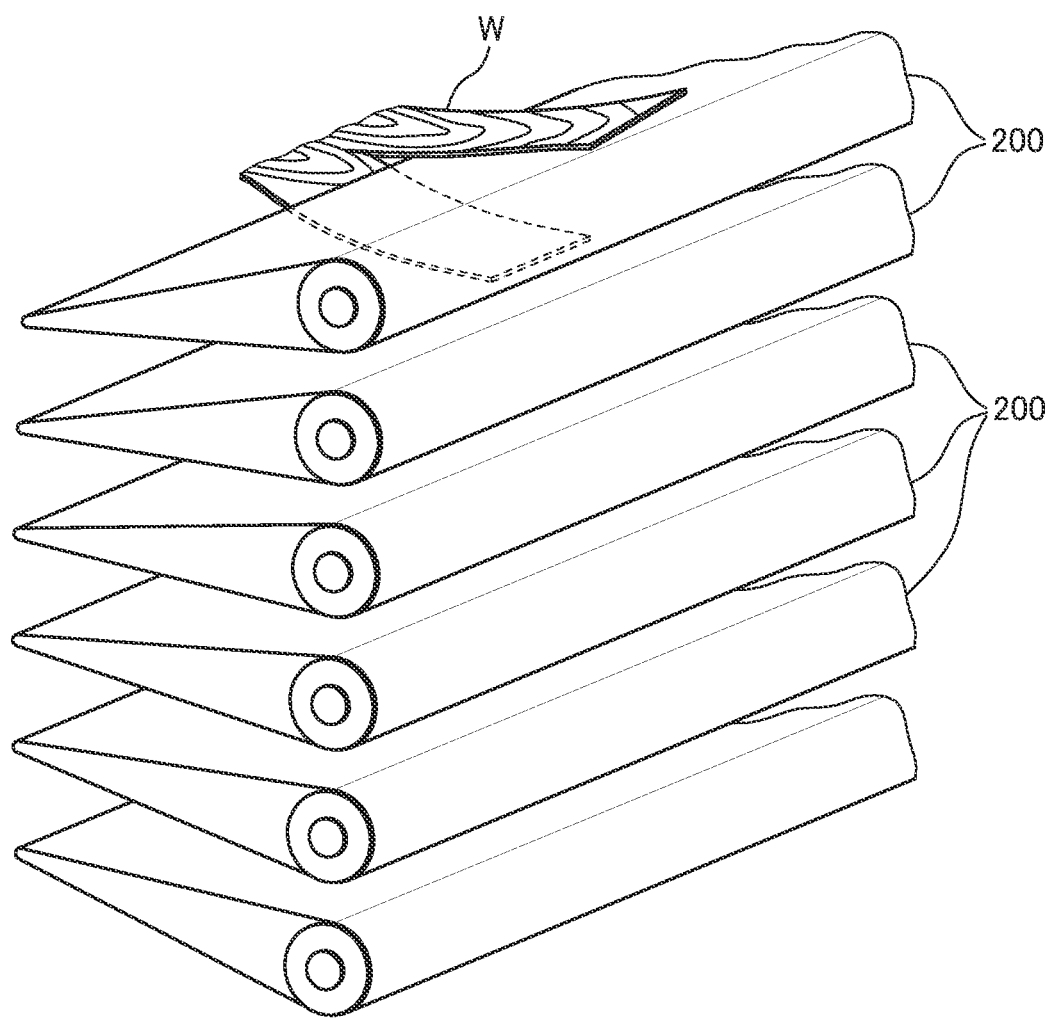
FIG. 9 is an illustrative view illustrating an example of a defect occurring in a veneer sheet in a conventional guide plate.

The auto feeder 4 is configured such that the veneer sheets W are first sequentially carried in from the carry-in conveyor 40 to the veneer sheet feed device 1 of the feed conveyor 10 in an aspect illustrated in FIG. 8A, and then sequentially carried in in an aspect illustrated in FIG. 8B. Note that FIG. 8A schematically illustrates a position of the guide member 20 illustrated in FIG. 5, and FIG. 8B schematically illustrates a position of the guide member 20 illustrated in FIG. 4. As illustrated in FIG. 8A, a position around an axis of each rotary output shaft 31 is set in advance such that the starting ends 22c of the guide members 20 belonging to the first, third, and fifth conveyance stages are located at the lower limit, and the starting ends 22c of the guide member 20 belonging to the second and fourth conveyance stages are located at the upper limit. The carry-in conveyor 40 is in the upper limit position.

In this state, the veneer sheet W carried in from the carry-in conveyor 40 is conveyed along the upper surface of the guide plate 22 of the guide member 20 belonging to the first conveyance stage toward the delivery roller 11 of the feed conveyor 10 of the same conveyance stage. When the conveyance of the veneer sheet W to the feed conveyor 10 of the first conveyance stage is completed, next, in order to convey the veneer sheet W to the feed conveyor 10 of the third conveyance stage, the piston rod of the fluid cylinder 44 is driven to be contracted, and the roller 42 of the carry-in conveyor 40 is lowered to a predetermined position in the vicinity of the starting end 22c of the guide member 20 belonging to the third conveyance stage.

In this state, the veneer sheet W carried in from the carry-in conveyor 40 is conveyed along the upper surface of the guide plate 22 of the guide member 20 belonging to the third conveyance stage toward the delivery roller 11 of the feed conveyor 10 of the same conveyance stage. When the conveyance of the veneer sheet W to the feed conveyor 10 of the third conveyance stage is completed, next, in order to convey the veneer sheet W to the feed conveyor 10 of the fifth conveyance stage, the piston rod of the fluid cylinder 44 is driven to be contracted, and the roller 42 of the carry-in conveyor 40 is lowered to a predetermined position in the vicinity of the starting end 22c of the guide member 20 belonging to the fifth conveyance stage.

In this state, the veneer sheet W carried in from the carry-in conveyor 40 is conveyed along the upper surface of the guide plate 22 of the guide member 20 belonging to the fifth conveyance stage toward the delivery roller 11 of the feed conveyor 10 of the same conveyance stage. When the conveyance of the veneer sheet W to the feed conveyor 10 of the fifth conveyance stage is completed, the decelerator-equipped motor 37 is rotary driven so that each rotary output shaft 31 rotates by 180° from the state illustrated in FIG. 8A.

When each rotary output shaft 31 rotates by 180°, as illustrated in FIG. 8B, the starting ends 22c of the guide members 20 belonging to the second and fourth conveyance stages are located at the lower limit, and the starting ends 22c of the guide members 20 belonging to the first, third, and fifth conveyance stages are located at the upper limit. After each rotary output shaft 31 rotates by 180°, or at the same time as the rotation of each rotary output shaft 31, the piston rod of the fluid cylinder 44 is further driven to be contracted, and the roller 42 of the carry-in conveyor 40 is lowered to a predetermined position in the vicinity of the starting end 22c of the guide member 20 belonging to the sixth conveyance stage, that is, the lower limit position.

In this state, the veneer sheet W carried in from the carry-in conveyor 40 is conveyed along the upper surface of the guide plate 22 of the guide member 20 belonging to the sixth conveyance stage toward the delivery roller 11 of the feed conveyor 10 of the same conveyance stage. When the conveyance of the veneer sheet W to the feed conveyor 10 of the sixth conveyance stage is completed, next, in order to convey the veneer sheet W to the feed conveyor 10 of the fourth conveyance stage, the piston rod of the fluid cylinder 44 is driven to be extended, and the roller 42 of the carry-in conveyor 40 is elevated to a predetermined position in the vicinity of the starting end 22c of the guide member 20 belonging to the fourth conveyance stage.

In this state, the veneer sheet W carried in from the carry-in conveyor 40 is conveyed along the upper surface of the guide plate 22 of the guide member 20 belonging to the fourth conveyance stage toward the delivery roller 11 of the feed conveyor 10 of the same conveyance stage. When the conveyance of the veneer sheet W to the feed conveyor 10 of the fourth conveyance stage is completed, next, in order to convey the veneer, sheet W to the feed conveyor 10 of the second conveyance stage, the piston rod of the fluid cylinder 44 is driven to be extended, and the roller 42 of the carry-in conveyor 40 is elevated to a predetermined position in the vicinity of the starting end 22c of the guide member 20 belonging to the second conveyance stage.

In this state, the veneer sheet W carried in from the carry-in conveyor 40 is conveyed along the upper surface of the guide plate 22 of the guide member 20 belonging to the second conveyance stage toward the delivery roller 11 of the feed conveyor 10 of the same conveyance stage. When the conveyance of the veneer sheet W to the feed conveyor 10 of the second conveyance stage is completed, next, in order to convey the veneer sheet W to the feed conveyor 10 of the first conveyance stage, the piston rod of the fluid cylinder 44 is further driven to be extended, and the roller 42 of the carry-in conveyor 40 is elevated to a predetermined position in the vicinity of the starting end 22c of the guide member 20 belonging to the first conveyance stage, that is, to the upper limit position (refer to first step in FIG. 8A).

In this manner, in the aspects illustrated in FIGS. 8A and 8B, the fluid cylinder 44 is driven so that the veneer sheets W are carried in from the carry-in conveyor 40 to the feed conveyor 10 in the order of the first stage→the third stage→the fifth stage→the sixth stage→the fourth stage→the second stage, and the roller 42 of the carry-in conveyor 40 is configured to move up and down around the pivot shaft 45 accordingly.

As a result, each rotary output shaft 31 may be kept in the same state while the veneer sheets W are carried into the first stage→the third stage→the fifth stage and while the veneer sheets W are carried into the sixth stage→the fourth stage→the second stage, so that control of each rotary output shaft 31 may be simplified. An amount of movement of the carry-in conveyor 40 around the pivot shaft 45 may be substantially constant and small for each conveyance stage, so that it is possible to stabilize an operation of the carry-in conveyor 40 including the fluid cylinder 44 and make the control efficient.

As is apparent from the description above, in the veneer sheet feed device 1 according to the above-described embodiment, the pivot mechanism 30 including each rotary output shaft 31, each swash plate cam 38, each cam follower 25 and the like is configured to allow the starting end 22c of the guide member 20 belonging to the conveyance stage immediately above the conveyance stage in which the veneer sheet W is to be carried from the carry-in conveyor 40 this time to pivot to a portion above a horizontal line passing through the center of the roller shaft 21a located at the terminal end thereof.

As described above, in each conveyance stage of the veneer sheet feed device 1, each delivery roller 11 is set to have such a width dimension that the rectangular veneer sheets W having the lengths of three to six feet (about 90 cm to about 180 cm) may be simultaneously delivered in three or four lines. Therefore, when there is distortion caused by a structure or deflection in a roller shaft direction in each delivery roller 11, in a conventional method in which the guide plate is fixed, an opening space of each carry-in stage, that is, the opening space between the vertically adjacent guide plates is narrow, so that it has been extremely difficult to pass the veneer sheet W from the carry-in conveyor 40 to the guide member 20. This tendency becomes more remarkable as the number of conveyance stages of the veneer sheet feed device 1 increases to four, five, six and the like as the veneer sheet dryer becomes larger. In a case where a roller diameter is increased in order to reduce the deflection in the roller shaft direction in each delivery roller 11, the same applies in that the opening space of each carry-in stage is narrowed.

According to the above-described embodiment, it is possible to effectively prevent the veneer sheet W from coming into contact with the guide member 20 belonging to the conveyance stage immediately above the conveyance stage in which this veneer sheet W is carried. As a result, it is possible to excellently prevent overlapping of the veneer sheets W and damage of the veneer sheet W due to the contact with the guide member 20.

In the above-described embodiment, the swash plate cams 38 are fixed to each common rotary output shaft 31, the cam follower 25 including the rolling roller 25b rolling on the corresponding swash plate cam 38 is fixed to each guide member 20, and the starting ends 22c of the respective guide members 20 may be moved up and down at the same time via the respective cam followers 25 by the rotary drive of each rotary output shaft 31. As a result, the pivot mechanism 30 that moves each guide member 20 up and down may be simply configured.

In the embodiment described above, the swash plate cams 38 are fixed to each rotary output shaft 31 so as to be in the same inclined state every other stage, and are set such that phases around the rotary output shaft 31 of the swash plate cams 38 located vertically adjacently are shifted by 180°. As a result, a control method of the pivot mechanism 30 may be simplified.

Note that, although it is configured in the above-described embodiment such that the veneer sheets W are carried in from the carry-in conveyor 40 in the order of the first stage→the third stage→the fifth stage→the sixth stage→the fourth stage→the second stage→the first stage of the conveyance stages of the feed conveyor 10, but the invention is not limited thereto, and for example, the carry-in order may be changed so that the veneer sheets W are carried in from the carry-in conveyor 40 in the order of the sixth stage→the fourth stage→the second stage→the first stage→the third stage→the fifth stage→the sixth stage.

Alternatively, it is also possible to configure such that the veneer sheets W are carried in from the carry-in conveyor 40 in the order of the first stage→the second stage→the third stage→the fourth stage→the fifth stage→the sixth stage, and then in the order of the sixth stage→the fifth stage→the fourth stage→the third stage→the second stage→the first stage. In this case, each rotary output shaft 31 is driven to be rotated by half rotation for each conveyance stage in order, and the opening space of the conveyance stage in which the veneer sheet W is carried is secured each time the veneer sheet W is carried in.

In addition, the invention is not limited to the above-described embodiment and a variation thereof, and may be implemented in an aspect to which various modifications are added without departing from the gist thereof.

REFERENCE SIGNS LIST

1 Veneer sheet feed device
3 Deposition unit
4 Auto feeder
5 Roll dryer (veneer sheet dryer)
10 Feed conveyor
11 Delivery roller
20 Guide member
21 Guide roller
21a Roller shaft (pivot shaft)
22 Guide plate
22c Starting end
23 Side wall
25 Cam follower
25a Cam shaft
25b Rolling roller
30 Pivot mechanism
31 Rotary output shaft (rotary shaft)
35 Rotary input shaft
37 Decelerator-equipped motor
38 Swash plate cam
40 Carry-in conveyor
42 Roller (terminal end)
45 Pivot shaft
50 Conveyance unit
51, 52 Feed roller
W Veneer sheet

The invention claimed is:

1. A veneer sheet feed device for multistage veneer sheet dryer, comprising:

feed conveyors provided between a carry-in conveyor a terminal end of which on a conveyance downstream side is provided so as to be pivotable up and down around a predetermined pivot shaft on a conveyance upstream side and a veneer sheet dryer including a plurality of upper and lower stages of conveyance units in which a plurality of pairs of upper and lower feed rollers is arranged in a conveyance direction, the feed conveyors for feeding veneer sheets carried in from the carry-in conveyor to the conveyance units for each of a plurality of upper and lower conveyance stages arranged corresponding to the conveyance units, wherein the feed conveyors are arranged so as to be radially spread across the upper and lower conveyance stages from the conveyance upstream side to the conveyance downstream side corresponding to carry-in positions determined in advance defined by pivot positions of the terminal end of the carry-in conveyor, the veneer sheets are set to be sequentially carried in from the carry-in conveyor through guide members belonging to the conveyance stages to the feed conveyors in predetermined order, each of the guide members is provided such that a starting end on the conveyance upstream side is pivotable up and down around a predetermined pivot shaft on the conveyance downstream side, and a pivot mechanism that allows the starting end of the guide member belonging to the conveyance stage immediately above the conveyance stage in which a veneer sheet is carried from the carry-in conveyor this time to pivot to a portion above a horizontal position of a terminal end of this guide member.

2. The veneer sheet feed device for multistage veneer sheet dryer according to claim 1, wherein the pivot mechanism is provided with swash plate cams fixed to a common rotary shaft extending vertically and provided corresponding to the respective guide members, and cam followers fixed to the respective guide members and including rolling rollers that roll on the corresponding swash plate cams, respectively, and starting ends of the respective guide members are made simultaneously movable up and down via the respective cam followers by rotary drive of the rotary shaft.

3. The veneer sheet feed device for multistage veneer sheet dryer according to claim 2, wherein the swash plate cams are fixed to the rotary shaft so as to be in the same inclined state every other stage, and are set such that phases around the rotary shaft between the swash plate cams located vertically adjacently are shifted by 180°.

* * * * *